(12) United States Patent
Lundquist et al.

(10) Patent No.: US 8,817,445 B1
(45) Date of Patent: Aug. 26, 2014

(54) VOLTAGE SURGE PROTECTION DEVICE AND HIGH VOLTAGE CIRCUIT BREAKERS

(75) Inventors: Jan Lundquist, Ludvika (SE); Jürgen Häfner, Ludvika (SE); Leif Sköld, Ludvika (SE); Håkan Wieck, Ludvika (SE); Dag Andersson, Ludvika (SE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 14/128,986

(22) PCT Filed: Jun. 27, 2011

(86) PCT No.: PCT/EP2011/060718
§ 371 (c)(1),
(2), (4) Date: Apr. 28, 2014

(87) PCT Pub. No.: WO2013/000498
PCT Pub. Date: Jan. 3, 2013

(51) Int. Cl.
*H02H 1/00* (2006.01)
*H02H 9/04* (2006.01)
*H02H 1/04* (2006.01)
*H02H 3/22* (2006.01)
*H02H 9/06* (2006.01)
*H02H 7/12* (2006.01)

(52) U.S. Cl.
CPC .................................. *H02H 9/041* (2013.01)
USPC ............ 361/124; 361/117; 361/118; 361/120

(58) Field of Classification Search
USPC ....................................................... 361/124
See application file for complete search history.

(56) References Cited

U.S. PATENT DOCUMENTS

| 4,652,964 | A | 3/1987 | Ziegenbein |
| 5,583,734 | A | 12/1996 | McMills et al. |
| 7,433,169 | B2 * | 10/2008 | Kamel et al. ................... 361/127 |
| 8,699,197 | B2 * | 4/2014 | Douglass et al. ............. 361/118 |
| 2001/0015685 | A1 | 8/2001 | McLoughlin |
| 2004/0052023 | A1 | 3/2004 | Asplund |
| 2011/0133817 | A1 | 6/2011 | Brueckl et al. |

FOREIGN PATENT DOCUMENTS

| DE | 10 2007 042 989 A1 | 12/2008 |
| WO | WO 2008/145460 A1 | 12/2008 |
| WO | WO 2010/022750 A1 | 3/2010 |
| WO | WO 2011/054524 A1 | 5/2011 |

* cited by examiner

*Primary Examiner* — Dharti Patel
(74) *Attorney, Agent, or Firm* — Birch, Stewart, Kolasch & Birch, LLP

(57) ABSTRACT

A voltage surge protection device for protection of a high voltage device includes a varistor having a first part and a second part separated by varistor material. The voltage surge protection device further includes an expandable member arranged to act on a movable electrical contact for short-circuiting the voltage surge protection device upon a threshold voltage being applied between the first part and the second part of the varistor. A high voltage circuit breakers includes one or more semiconductor devices connected in series and the voltage surge protection device connected in parallel thereto.

20 Claims, 6 Drawing Sheets

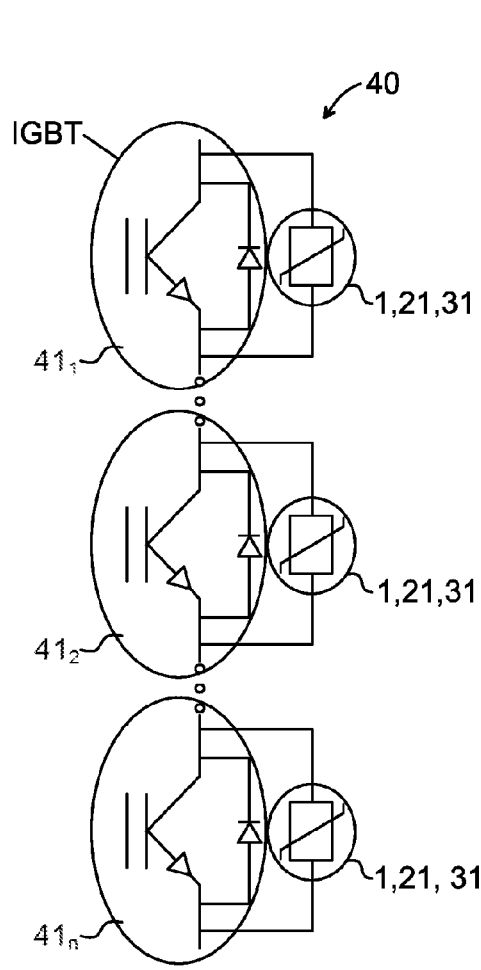
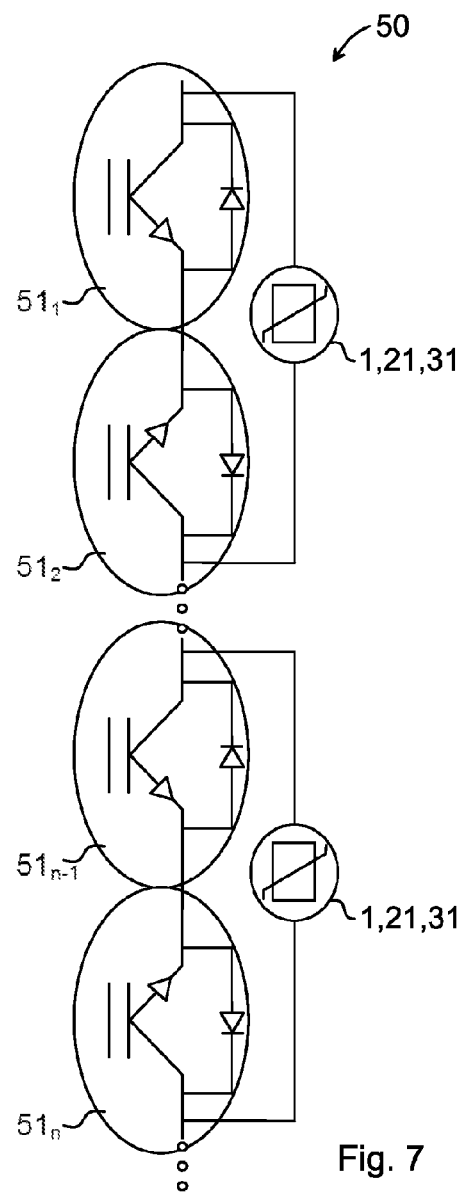
Fig. 6
Fig. 7

VOLTAGE SURGE PROTECTION DEVICE AND HIGH VOLTAGE CIRCUIT BREAKERS

FIELD OF THE INVENTION

The invention relates generally to the field of high voltage devices, and in particular to protection of such high voltage devices.

BACKGROUND OF THE INVENTION

Most electrical systems and devices are occasionally subject to excessive transient voltages being applied and such voltage surges, e.g. due to lightning strikes, may result in very costly damages and subsequent service interruption. Means for protecting the electrical systems and devices are therefore needed.

Voltage dependent resistors, varistors, are frequently used for protecting electrical devices from voltage surges. The varistor is also referred to as non-linear resistor as it has nonlinear current-voltage characteristics. If an applied voltage is less than a certain voltage, the varistor is essentially an insulator. If the voltage applied is above the certain voltage, the switching voltage, the varistor resistance drops and allows an increased current to flow through it. The varistor is connected in parallel to the device to be protected and arranged to, when triggered by an overvoltage, shunt the current created by the high voltage away from the device.

Further, various kinds of circuit breakers are available for interrupting fault currents. However, it is difficult to design circuit breakers for DC currents due to the high currents without any zero current crossings at which to break the current.

One known high voltage direct current (HVDC) circuit breaker based on insulated-gate bipolar transistors (IGBT) technology comprises a number of stack-mounted IGBT units. Each unit comprises several IGBT modules connected in parallel, each module in turn comprising a number of paralleled semiconductor chips which normally carry only a fraction of a line voltage. If one such semiconductor chip (IGBT chip) is destroyed by overvoltage, it is short-circuited by an internal device which has to withstand the full line current. The short-circuiting device has a limited current carrying capability and the complete IGBT unit has to be replaced within short.

For DC breaker applications, having a large continuous DC current without any zero current crossings which would enhance the transitions from one failed IGBT chip to another, the failed IGBT chip cannot stay in the short circuit mode for very long. The DC breaker thus has to be tripped and the failed device has to be replaced.

There is thus need for improvements in this regard.

SUMMARY OF THE INVENTION

An object of the invention is to provide a voltage surge protection device enabling a safe short-circuit function for high voltage devices, such as circuit breakers.

The object is according to a first aspect of the invention achieved by a voltage surge protection device for protection of a high voltage device. The voltage surge protection device comprises a varistor having a first part and a second part, separated by varistor material. The voltage surge protection device comprises an expandable member arranged to act on a movable electrical contact for short-circuiting the voltage surge protection device upon a threshold voltage being applied between the first part and the second part of the varistor. The invention provides a voltage surge protection device that uses thermal energy of a varistor to trigger a bypass process, whereby neither an external control nor an auxiliary power supply is required to form the bypass.

In an embodiment, the varistor material, when subjected to the threshold voltage, produces heat and/or gas expanding the expandable member.

In an embodiment, the movable electrical contact is arranged to be movable between a first position in which the voltage surge protection device is non-activated, and a second position in which the voltage surge protection device is activated. The first part and the second part are electrically connected by the movable electrical contact when it is in its second position.

In an embodiment, the varistor comprises an electrically insulating housing enclosing the varistor at least partly in a lengthwise direction of the voltage surge protection device. The movable electrical contact is arranged to be movable along the electrically insulating housing between a first position in which the voltage surge protection device is non-activated, and a second position in which the voltage surge protection device is activated, wherein the first part and the second part are electrically connected by the movable electrical contact when it is in its second position.

In an embodiment, the movable electrical contact comprises a movable helical spring or a movable metal ring.

In an embodiment, the voltage surge protection device comprises a movable electrically insulating ring arranged between the expandable member and the electrical contact. The expandable member is arranged to act on the movable electrical contact via the movable electrically insulating ring. The movable electrically insulating ring may be arranged to be movable along an electrically insulating housing enclosing the varistor at least partly in a lengthwise direction of the voltage surge protection device.

In an embodiment, the movable electrical contact is arranged between the expandable member and an electrically insulating ring. The movable electrical contact contacts a helical spring when in the second position, the helical spring being arranged on the lower part.

In an embodiment, the movable electrical contact is arranged in a bore through an electrically insulation housing enclosing the varistor at least partly in a lengthwise direction, and into the varistor material, one side end of the movable electrical contact being in contact with the expandable member arranged as a shell around the varistor material and partly in the bore, the movable electrical contact being arranged to move in a radial direction.

In an embodiment, the expandable member comprises a material expandable when subjected to temperature rises and/or pressure.

In an embodiment, the expandable member comprises silicone gel, silicone paste or silicone grease.

The object is according to a second aspect of the invention achieved by a high voltage circuit breaker comprising one or more semiconductor unit(s) connected in series, wherein a voltage surge protection device as above is connected in parallel to each such semiconductor unit(s).

The object is according to a third aspect of the invention achieved by a high voltage circuit breaker comprising two or more semiconductor units, wherein the semiconductor units are connected anti-serially pairwise, and wherein a voltage surge protection device as above is connected in parallel to each such pair of semiconductor units.

Further features and advantages thereof will become clear upon reading the following description and the accompanying drawings.

BRIEF DESCRIPTION OF THE DRAWINGS

FIG. 6 illustrates a first embodiment of a HVDC circuit breaker comprising a protection device.

FIG. 7 illustrates a second embodiment of a HVDC circuit breaker comprising a protection device.

DETAILED DESCRIPTION OF EMBODIMENTS

In the following description, for purposes of explanation and not limitation, specific details are set forth such as particular designs, etc. in order to provide a thorough understanding of the invention. However, it will be apparent to those skilled in the art that the invention may be practiced in other embodiments that depart from these specific details. In other instances, detailed descriptions of well-known devices and circuits are omitted so as not to obscure the description of the invention with unnecessary detail. Like numbers refer to like elements throughout the description.

Figure 1A:
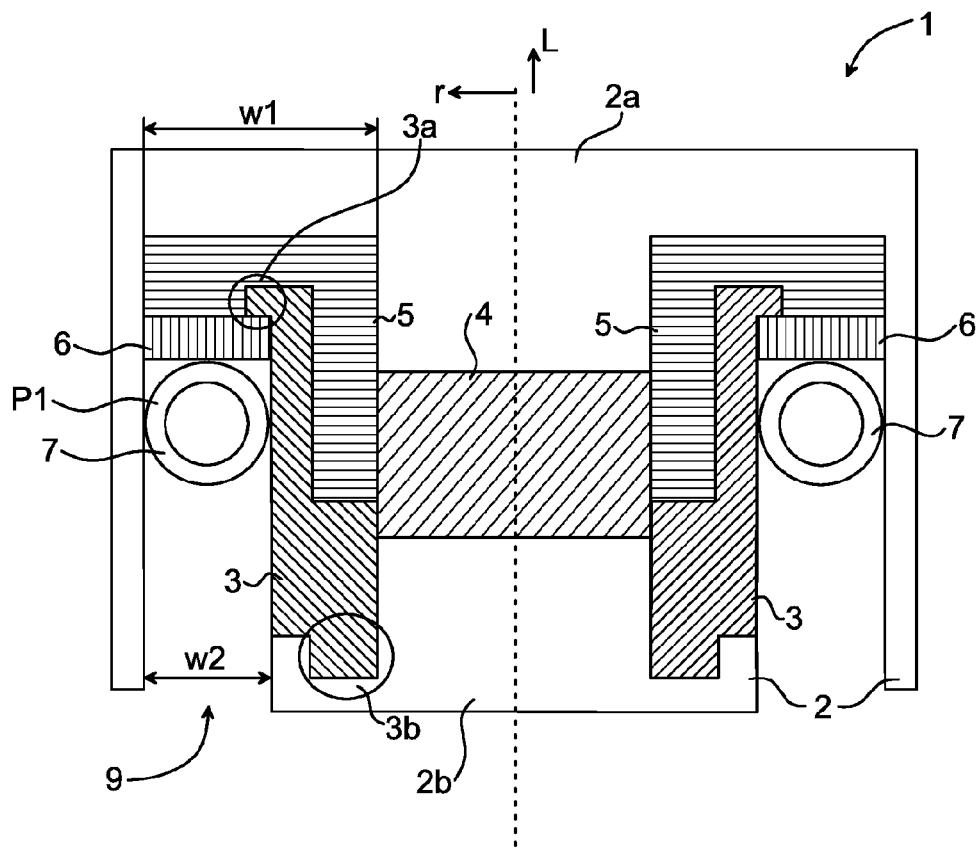
FIGS. 1a and 1b illustrate a voltage surge protection device in accordance with a first embodiment of the invention, before and after activation thereof.
Figure 1B:
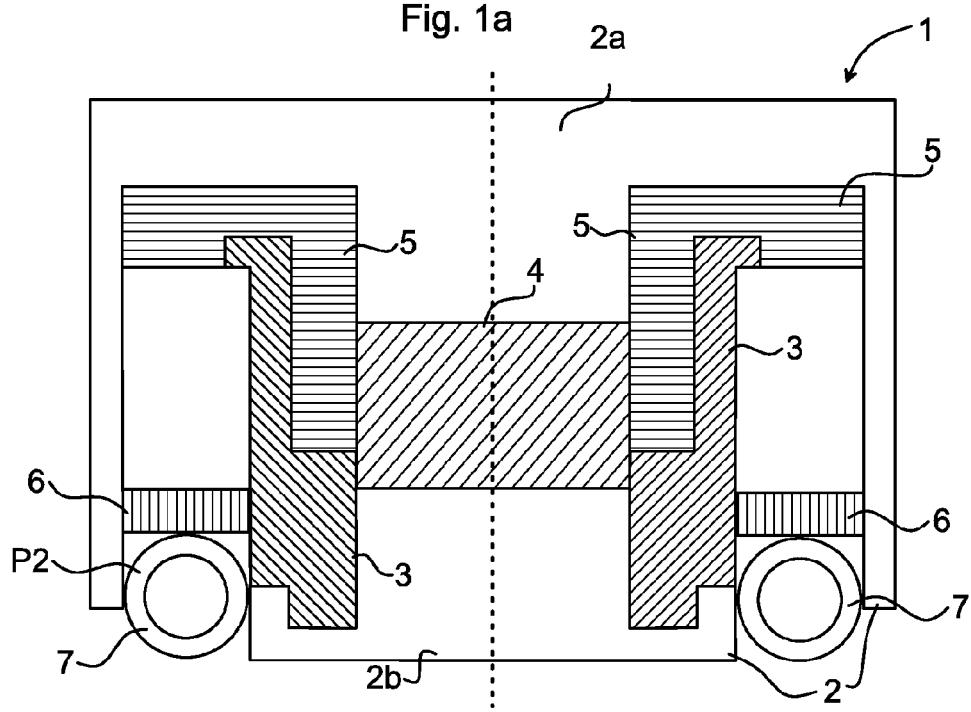

FIGS. 1a and 1b illustrate a voltage surge protection device in accordance with a first embodiment of the invention, before and after activation thereof. The voltage surge protection device 1, in the following denoted protection device 1, is illustrated in FIG. 1a in a cross-sectional view before activation. The voltage surge protection device 1 is suitable for protecting high voltage devices, high voltage direct current devices as well as high voltage alternating current devices.

The protection device 1 comprises a varistor 2 having a sealed insulating housing 3 preferably of a cylindrical shape. The varistor 2 comprises a first part 2a, in the following denoted upper part 2a, and a second part 2b, in the following denoted lower part 2b. The upper and lower parts 2a, 2b are made of metal and constitute electrodes. The upper part 2a and the lower part 2b are separated by varistor material 4. The varistor 2 may for example be a metal oxide varistor (MOV). In a length direction L of the protection device 1, the varistor 2 thus comprises the upper part 2a, the varistor material 4 and the lower part 2b.

The varistor material 4 and the upper part 2a of the varistor 2 are surrounded, circumferentially and in the length direction L, by an expandable member 5. The expandable member 5 is thus arranged, in a radial direction r of the protection device 1, between at least part of the surrounding cylindrical insulating housing 3 on one side and the varistor material 4 and the upper part 2a of the varistor 2 on another side. The expandable member 5 comprises a material having a voltage withstand exceeding the protective level of the varistor 2. The expandable member 5 is thermally, chemically and electrically stable prior to varistor 2 failure and is chosen so as to withstand temperatures that appears when the varistor 2 absorbs its rated energy, for example 250° C. The heat generated by the varistor material 4 upon failure of the varistor 2 is quickly and efficiently transferred to the expandable member 5.

Upon failure of the varistor 2, defined for example by a varistor temperature exceeding 300° C. or by arcing occurring inside or along a collar of the varistor 2, the expandable member 5 breaks down thermally, thereby producing gases through chemical decomposition. The expandable member 5 surrounding the varistor material 4, has a viscosity that enables a gas pressure to activate an electrical contact device, which will be described more in detail later.

Figure 2:
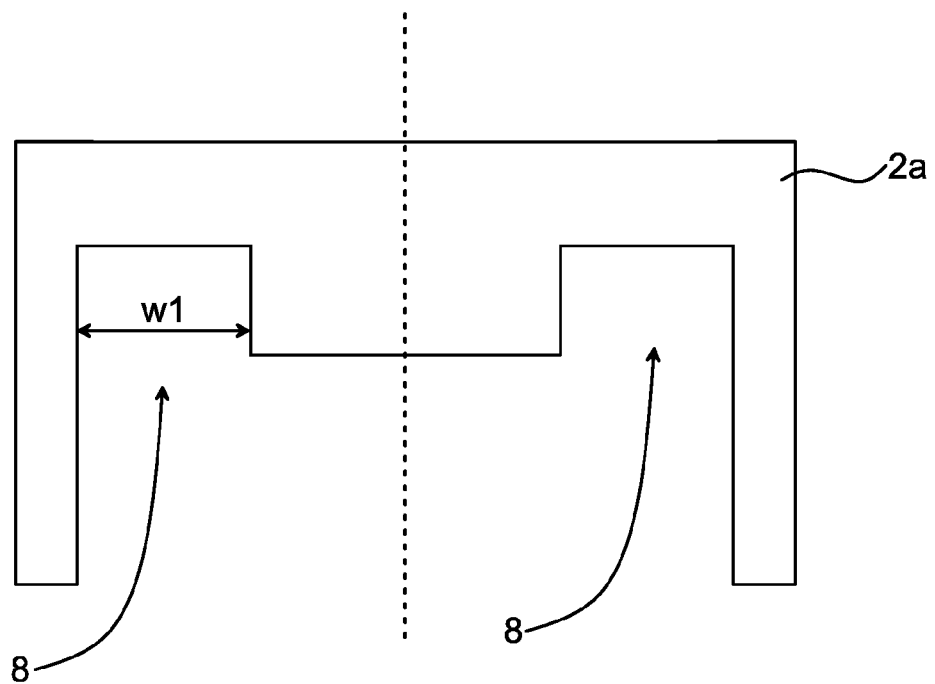
FIG. 2 illustrates an upper part of a varistor of the voltage surge protection device of FIGS. 1a and 1b.

The upper part 2a of the varistor 2 is designed so as to comprise, at a radial distance from the center of the protection device 1, a ring shaped first channel 8 having a suitable first width w1 and being partly filled. The first channel 8 is illustrated separately in FIG. 2 for clarity, and it can be seen in FIGS. 1a and 1b that the expandable member 5 is arranged in the first channel.

A movable insulating ring 6 is arranged as a collar around the insulating housing 3. The insulating ring 6 is movable between a first and a second position in the length direction 1 of the protection device 1, i.e. along the insulating housing 3. An upper surface of the insulating ring 6 is in contact with the expandable member 5. The expandable member 5 is thus surrounded by the upper part 2a of the varistor, the varistor material 4 and the insulating ring 6.

The insulating housing 3 may have a stepped shape as illustrated in FIGS. 1a and 1b, having at an upper end a projecting part 3a lying on the insulating ring 6. The insulating ring 6 has a first position at which parts of its upper surface abuts the projecting part 3a. The expandable member 5 surrounds the projecting part 3a of the insulating housing 3. The stepped shape of the insulating housing has a lower projecting part 3b surrounded by the lower part 2b of the varistor 2, leaving part of the lower part 2b accessible from a second channel 9.

In the radial direction r, a second ring shaped channel 9 is formed in the first channel 8. The second channel 9 is formed between the insulating housing 3 and the outermost part of the upper part 2a. The second ring shaped channel 9 has a second width w2. The lower part 2b of the varistor 2 constitutes, together with the insulating housing 3, a first wall of the second channel 9. The outermost part of the upper part 2a of the varistor 2 constitutes an opposite second wall of the second channel 9.

In the second channel 9 a movable electrically conductive contact device 7, e.g. a helical spring, is arranged. The contact device 7 is movable between a first position P1 and a second position P2 in the length direction L of the protection device 1, i.e. partly along the insulating housing 3. In the lengthwise direction L of the protection device 1, the contact device 7 is located below the insulting ring 6. The contact device 7 is in the following exemplified by the helical spring for describing the invention, but it is to be noted that the contact device 7 can be any suitable device enabling electrical contact to the made, e.g. a metal ring. The helical spring 7 provides a stable short-circuit as it has several contact surfaces with both the upper part 2a and the lower part 2b in the second position P2. Further, the helical spring 7 is easy to put in place, giving a simple manufacture of the protection device 1.

FIG. 1b illustrates the protection device 1 in its activated state. The insulating ring 6 is, as mentioned, movable and has an upper position (illustrated at P1 in FIG. 1a) in its non-activated state and a lower position P2 (illustrated in FIG. 1b) which it takes when the protection device 1 is activated. The helical spring 7 is movably arranged below the insulating ring 6 and when the insulating ring 6 is acted on by the expandable member 5, thus moving downwards, also the helical spring 7 is moved downwards.

In normal operation, illustrated in FIG. 1a, the insulating ring 6 and the helical spring 7 are in their upper positions P1, leaving an air clearance between the upper part 2a and the lower part 2b of the varistor 2. The air clearance comprises the width w2 of the second channel 9.

When the varistor 2 fails, the varistor material 4 produces heat and possibly gases. The expandable member 5 then expands due to the increased temperature and gas pressure. As mentioned, the expandable member 5 thus acts on the insulating ring 6, which moves the helical spring 7, both then taking their lower positions P2. In the lower position P2, the helical spring 7 is in electrical contact with the upper part 2a of the varistor 2 and also in electrical contact with the lower part 2b of the varistor 2. The helical spring 7 thus short-circuits the protection device 1 by providing electrical contact between the upper part 2a and the lower part 2b.

Figure 3A:
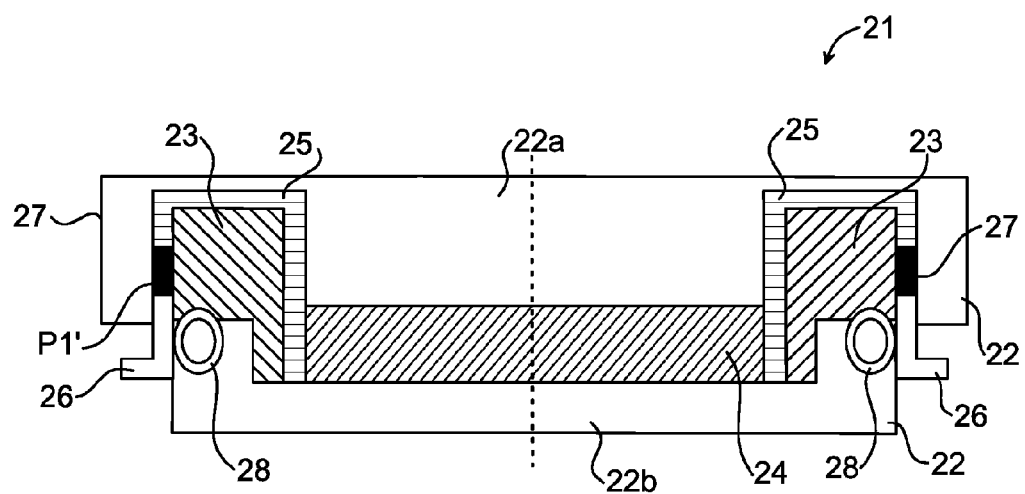
FIGS. 3a and 3b illustrate a voltage surge protection device in accordance with a second embodiment of the invention, before and after activation thereof.
Figure 3B:
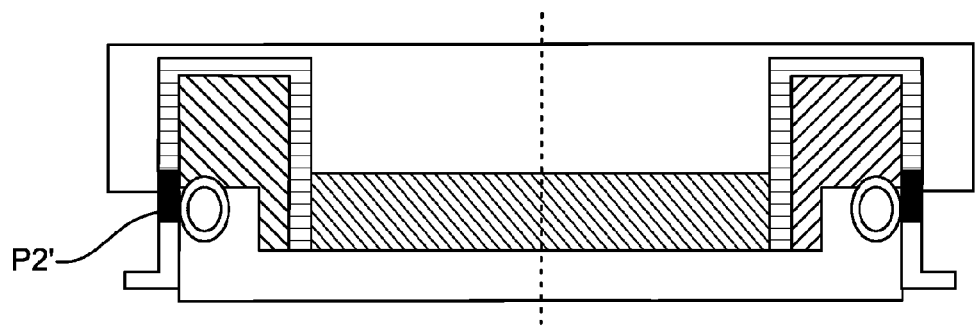

FIGS. 3a and 3b illustrate a voltage surge protection device 21 in accordance with a second embodiment of the invention, before and after activation thereof. The voltage surge protection device 21, in the following protection device 21, is similar to the first embodiment, comprising a varistor 22 having a first part 22a, in the following denoted upper part 22a, and a second part 22b, in the following denoted lower part 22b, separated by varistor material 24.

In the second embodiment, the electrical contact 27 comprises a movable metal ring 27 acted on by an expandable member 25, in a similar way as in the above described first embodiment. Only the main differences between the embodiments are described in the following. A movable insulating ring 26 is arranged under the metal ring 27 and ensures a required voltage withstand. In a first position P1', when the protection device 21 is non-activated (FIG. 3a) the insulating ring 26 is abutting a helical spring 28 arranged on the lower part 22b.

In a second position P2', the movable metal ring 27 comes in contact with the helical spring 28 arranged on the lower part 22b of the varistor 22. The helical spring 28 provides a stable short-circuit as it has several contact surfaces with both the upper part 22a and the lower part 22b.

Like in the first embodiment, when the varistor 22 fails, heat and gas are produced by the varistor material 24. The expandable member 25 then expands and moves due to the increased temperature and gas pressure. The expandable member 25 acts on the metal ring 27, which moves to its lower position P2'. In the lower position P2', the metal ring 27 short-circuits the protection device 1 by providing electrical contact between the upper part 22a and the lower part 22b of the varistor 22.

In an embodiment, the voltage surge protection device 1 comprises a movable electrically insulating ring 6 arranged between the expandable member 5, 25 and the electrical contact 7, 27. The expandable member 5, 25 is then arranged to act on the movable electrical contact 7, 27 via the movable electrically insulating ring 6. The movable electrically insulating ring 6 may be arranged to move along the electrically insulating housing 3, 23.

In another embodiment, the movable electrical contact 7 is arranged between the expandable member 5, 25 and an electrically insulating ring 26. The movable electrical contact 7 contacts a helical spring 28 when in the second position P2, P2'. The helical spring 28 is then arranged on the lower part 2b, 22b.

Figure 4:
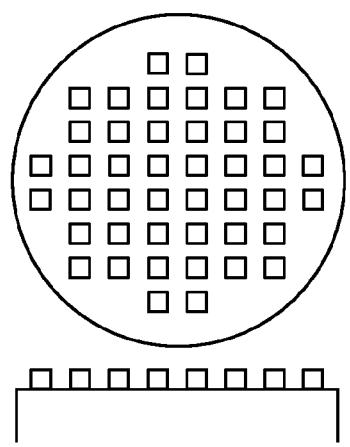
FIG. 4 illustrates a feature of an embodiment of the invention.

FIG. 4 illustrates a feature of an embodiment of the invention. The varistor 2, 22 may fail by internal arcing. To ensure that the gas pressure created upon varistor failure will act on the surrounding expandable member 5, 25 also if gas escapes from the horizontal surfaces of the upper part 2a and lower part 2b of the varistor, the surfaces in contact with the varistor material 4, 24 can be machined as illustrated in FIG. 4. That is, the surfaces comprises protruding parts with a size of a few millimeters thus creating ways for the gas to act on the expandable member 5, 25 while still providing a reliable electrical contact with the varistor 2, 22.

Figure 5A:
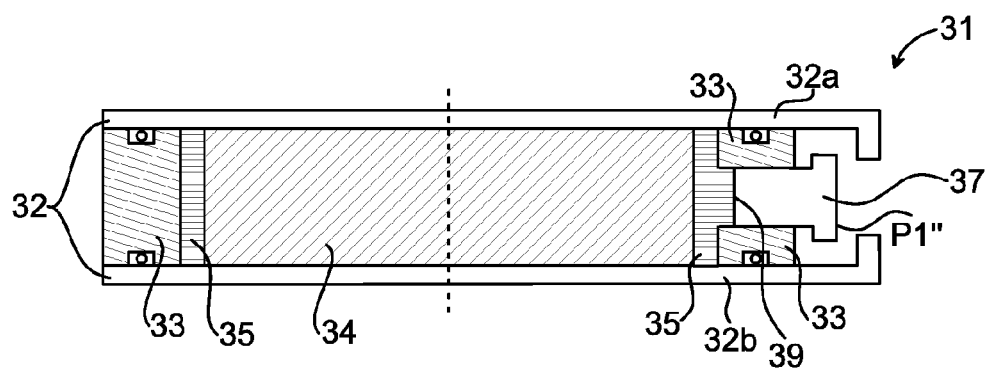
FIGS. 5a, 5b and 5c illustrate a voltage surge protection device in accordance with a third embodiment of the invention, in different views before and after activation thereof.
Figure 5B:
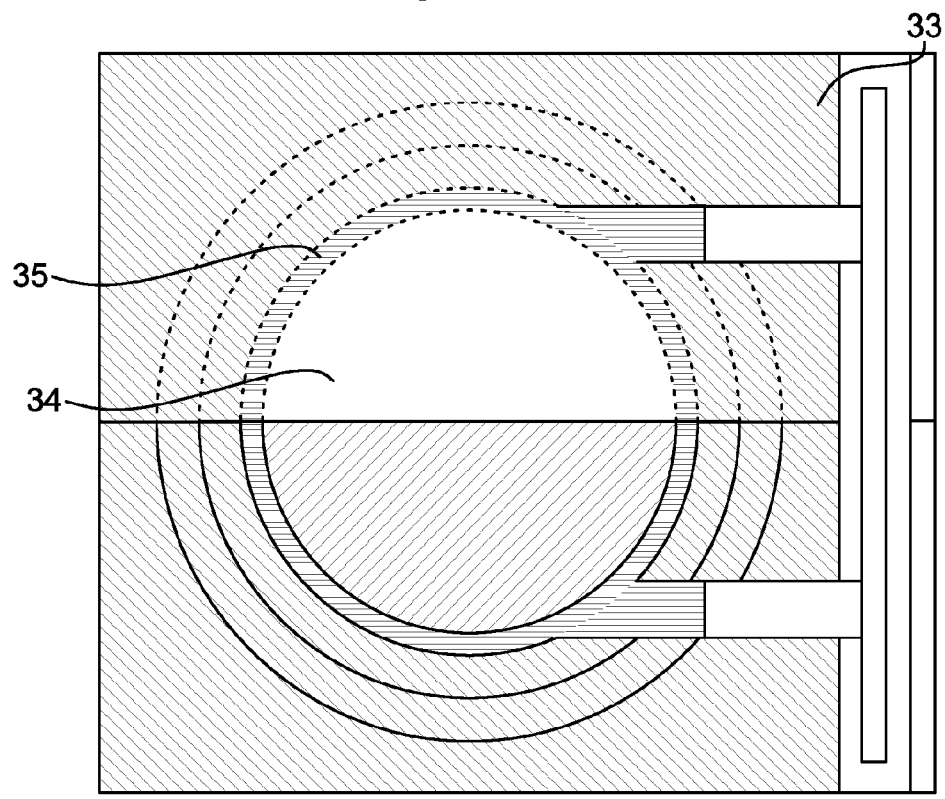
Figure 5C:
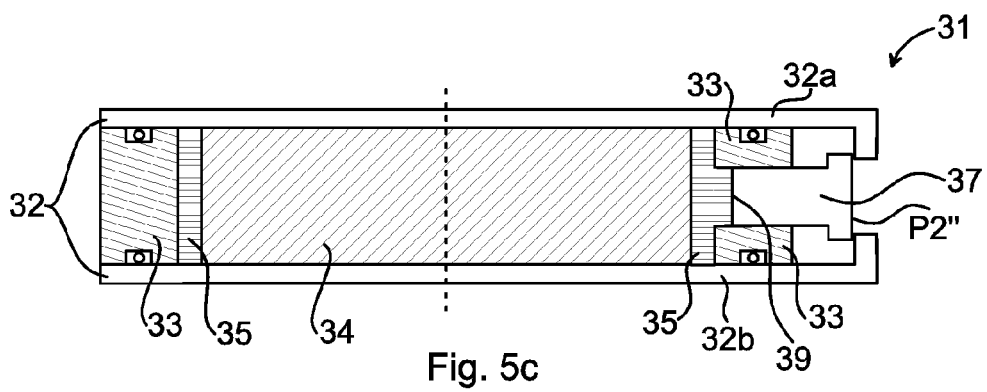

FIGS. 5a, 5b and 5c illustrates yet another embodiment of the voltage surge protection device 1. In particular, FIGS. 5a and 5b illustrate a voltage surge protection device 31 in accordance with a third embodiment of the invention, before activation thereof, and FIG. 5c illustrates the voltage surge protection device 31 after activation thereof. The voltage surge protection device 31, in the following protection device 31, is similar to the previous embodiments in that it comprises a varistor 32 having a first part 32a, and a second part 32b, separated by varistor material 34. In contrast to the previous embodiments, a movable electrical contact 37 is arranged to move in a horizontal direction instead of in a vertical direction.

FIGS. 5a and 5b illustrate the protection device 31 in a non-activated position, FIG. 5a in a cross-sectional side view and FIG. 5b in a cross-sectional top view. The expandable member 35 is provided between, as seen in a radial direction, the varistor material 34 and an electrically insulating housing 33. In a vertical direction, the varistor material 34 is provided between the first and second parts 32a, 32b of the varistor 32. The expandable member 35 is thus arranged as a cylindrical shell around the varistor material 34, as best seen in FIG. 5b.

The movable electrical contact 37 is movably arranged between a first position P1" in which the protection device 31 is non-activated and a second position P2" in which the protection device 31 is activated. When in the first position P1", i.e. when the expandable member 35 has not expanded due to gas and pressure from the varistor material 34, the movable electrical contact 37 is arranged partly through the electrically insulating housing 33 that surrounds the varistor 32, and partly outside the electrically insulating housing 33, thus protruding from the housing 33.

An end side 39 of the movable electrical contact 37 is in contact with the expandable member 35. The movable electrical contact 37 can be seen as arranged in a bore through the electrically insulating housing 33. The bore continues all the way to the shell of expandable member 35, the expandable member 35 thus filling part of this bore, and thereby being in contact with the end side 39 of the movable electrical contact 37. The expandable member 35 can thus act on the movable electrical contact 37 upon expansion thereof.

As for the previously described embodiments, when the varistor 32 fails, the expandable member 35 expands and moves the movable electrical contact 37 to its second position P2", in which the first part 32a and the second part 32b are in electrical contact by means of the movable electrical contact 37 moving in a radial direction as mentioned earlier, and thus short-circuiting the protection device 31.

The movable electrical contact 37 is thus arranged in the bore, through the cylindrical electrically insulation housing 33 that encloses the varistor 32 at least partly in a lengthwise direction. The end side of the movable electrical contact 37 is in contact with the expandable member 35 that is arranged as a cylindrical shell around the varistor material 34 and partly in the bore. The movable electrical contact 37 is arranged to move in a radial direction, i.e. in a direction perpendicular to the length direction of the protection device 31.

Three particular embodiments have been described above with reference to FIGS. 1a, 1b, 2, 3a, 3b, and 5a, 5b, 5c but in its most general embodiment, the protection device 1, 21, 31 comprises a varistor 2, 22, 32 having first part 2a, 22a, 32a and a second part 2b, 22b, 32b, separated by varistor material 4, 24, 34. The protection device 1, 21, 31 comprises an expandable member 5, 25, 35 that is arranged to act on a movable electrical contact 7, 27, 37. The voltage surge protection device 1, 21, 31 is short-circuited when a threshold voltage is applied between the first part 2a, 22a, 32a and the second part 2b, 22b, 32b of the varistor 2, 22, 32.

This can be accomplished by the varistor material 4, 24, 34 producing heat and/or gas(es) when subjected to the threshold voltage, and the produced heat and/or gas makes the expandable member 5, 25, 35 expand.

The movable electrical contact 7, 27, 37 is arranged to be movable between a first position P1, P1', P1" in which the voltage surge protection device 1, 21, 31 is non-activated, and a second position P2, P2', P2" in which the voltage surge protection device 1, 21, 31 is activated. In the first position P1, P1', P1' the varistor and in particular the varistor material 4, 24, 34, is essentially electrically non-conducting. In the second position P2, P2', P2" of the movable electrical contact 7, 27, 37 the first part 2a, 22a, 32a and the second part 2b, 22b, 32b are electrically connected by the movable electrical contact 7, 27, 37.

The movable electrical contact 7, 27, 37 may be arranged to be movable along an electrically insulating housing 3, 23, 33 that encloses the varistor 2, 22, 32 at least partly in a lengthwise direction L of the protection device 1.

As described earlier, the movable electrical contact may, for example comprise a movable helical spring 7 or a movable metal ring 27.

FIG. 6 illustrates a first embodiment of a HVDC circuit breaker comprising a protection device 1, 21, 31 as described. The HVDC breaker 40 comprises several series-connected semiconductors, e.g. IGBT units $41_1, 41_2, \ldots, 41_n$. Each IGBT unit may comprise several parallel-connected IGBT modules. One protection device 1, 21, 31 as described is connected in parallel to each such IGBT unit $41_1, 41_2, \ldots, 41_n$. It is to be noted that although IGBT units are used here as an example for illustrating and describing the invention, other semiconductor devices can be protected by the inventive concept.

Further, yet other switch applications, and even other devices than semiconductor devices, can be protected by protection devices in various aspects of the invention.

FIG. 7 illustrates a second embodiment of a HVDC circuit breaker comprising a protection device. The HVDC circuit breaker 50 of this embodiment also comprises a number of series—connected IGBT units $51_1, 51_2, \ldots, 51_{n-1}, 51_n$, wherein the IGBT units are connected anti-serially pair-wise, enabling the breaking of current in both current directions. One protection device 1, 21, 31 as described is connected in parallel to two such IGBT units.

The IGBT unit should enter a short-circuit failure mode (SCFM) upon failure. The protective device 1, 21, 31 provides such SCFM. When the IGBT unit fails, the protective device 1, 21, 31 changes from the state illustrated in FIGS. 1a and 3a and 5a, 5b to the activated states illustrated in FIGS. 1b and 3b and 5c, as described in relation to these figures.

Upon varistor failure, the protection device 1, 21, 31 behaves as follows:

If the varistor temperature exceeds 450-500° C., the expandable member 5, 25, 35 surrounding the varistor 2, 22, 32 shall break down thermally, thereby producing gases through chemical decomposition. The gases produced should not be poisonous or corrosive.

The expandable member 5, 25, 35 surrounding the varistor shall have a viscosity that enables the gas pressure to activate the electrical contact 7, 27, 37.

The housing shall mechanically withstand the internal gas pressure created by gassing or arcing.

The protection device 1, 21, 31, and in particular the varistor 2, 22, 32 shall be permanently short-circuited by means of the electrical contact 7, 27, 37 and the gas pressure shall be relieved.

The expandable member 5, 25, 35 should, as mentioned earlier and as is evident from the above, fulfill several requirements. The following group of polydimethylesilicone (PDMS) materials has been found to have the electrical, thermal, and viscosity properties required:

1) Silicone gel: two-component, curing at room temperature; very soft (gel hardness <100 g, penetration >5 mm); thermally stable up to +250° C.; during heating in oxygen-free environment beginning at about 400° C., the silicone gel is decomposed at into tricyclosilicone (Si(CH3)0)3 and other cyclic low molecular weight silicones.

2) Silicone paste: composed of PDMS and thickeners, for example amorphous silica (SiO2); decomposed in a similar way as silicone gel; transfers the hydraulic pressure better that silicone gel 3) Silicone grease: composed of silicone oil and a thickener, for example amorphous silica and other fillers; decomposed in a similar way as silicone gel; transfers the hydraulic pressure like silicone paste Upon varistor failure, it is most likely that the decomposing of the expandable member 5, 25, 35 is fast. The decomposed gas will then mostly consist of low molecular weight cyclo-silicones where tricyclosilicone (TCDMS) constitutes the largest volume. Because the boiling point of TCDMS is 133° C. it is gasified at the failing temperature of the varistor 2, 22, 32. The amount of gas (TCDMS) generated can be estimated in order to determine the amount of material needed to ensure activation of the electrical contact 7, 27, 37. From that the layer thickness of silicone gel, paste or grease surrounding the varistor block 2a, 4, 2b can be calculated.

Theoretically, 1 mole of TCDMS is created for each mole of PDMS. As a conservative assumption the material consists of 50% PDMS. Suppose also that 50% of the breakdown products consist of TCDMS. That means that only 25% of the material is used for gas generation. In the table below, the required layer thickness is estimated for the two embodiments Embodiment 1, Embodiment 2 described in relation to FIGS. 1a, 1b and 3a, 3b, respectively.

| Embodiment | | Embodiment 1 | | Embodiment 2 | |
|---|---|---|---|---|---|
| Varistor envelope area | cm2 | 46.6 | 46.6 | 46.6 | 46.6 |
| Helical spring load | N | 400 | 400 | 340 | 340 |
| Pressure area | cm2 | 40 | 40 | 9.2 | 9.2 |
| Gas pressure on contact ring | kPa | 200 | 200 | 470 | 470 |
| Expansion volume | cm3 | 68 | 68 | 9.2 | 9.2 |
| Material density | g/cm3 | 1 | 1 | 1 | 1 |
| Gas temperature | K | 406 | 673 | 406 | 673 |
| Moles of gas | | 0.00403 | 0.00243 | 0.00128 | 0.00077 |
| Proportion PDMS | % | 50 | 50 | 50 | 50 |
| Proportion TCDMS | % | 50 | 50 | 50 | 50 |

-continued

| Embodiment | | Embodiment 1 | | Embodiment 2 | |
|---|---|---|---|---|---|
| units gel/units TCDMS | | 4 | 4 | 4 | 4 |
| Mole weight TCDMS | | 222 | 222 | 222 | 222 |
| Mass of gassing material | g | 3.58 | 2.16 | 1.14 | 0.69 |
| Layer thickness | mm | 0.77 | 0.47 | 0.25 | 0.15 |

In the left columns of Embodiment 1 and Embodiment 2 the gas temperature is equal to the boiling point of TCDMS (the lowest possible gas temperature). In the right columns the gas temperature is 400° C. which is a typical thermal breakdown temperature for the varistor in e.g. HVDC circuit breaker application.

These examples show that a very thin layer of gassing material is needed to produce the necessary volume and pressure to activate the contact device in both designs and to ensure that the contact can be pressed all the way until fully closed. It is also shown that the residual gas pressure must be relieved in order to reduce the gas pressure when the contacts have been closed.

The invention claimed is:

1. A voltage surge protection device, the voltage surge protection device comprising a varistor having a first part and a second part, separated by varistor material configured to produce heat and/or gas when subjected to a threshold voltage applied between the first part and the second part of the varistor, wherein an expandable member is arranged to act on a movable electrical contact for short-circuiting the voltage surge protection device upon the threshold voltage being applied between the first part and the second part of the varistor, wherein the expandable member is configured to expand due to the heat and/or gas produced by the varistor material, the expandable member thereby breaking down thermally and producing gases through chemical decomposition, said gases of the expandable member having a gas pressure that moves the movable electrical contact.

2. The voltage surge protection device as claimed in claim 1, wherein the movable electrical contact is arranged to be movable between a first position in which the voltage surge protection device is non-activated, and a second position in which the voltage surge protection device is activated, wherein the first part and the second part are electrically connected by the movable electrical contact when in its second position.

3. The voltage surge protection device as claimed in claim 2, wherein the movable electrical contact is arranged between the expandable member and an electrically insulating ring, and wherein the movable electrical contact contacts a helical spring when in the second position, the helical spring being arranged on the second part.

4. The voltage surge protection device as claimed in claim 2, wherein the movable electrical contact comprises a movable helical spring or a movable metal ring.

5. The voltage surge protection device as claimed in claim 2, wherein the varistor comprises an electrically insulating housing enclosing the varistor at least partly in a lengthwise direction of the voltage surge protection device, and wherein the movable electrical contact is arranged to be movable along the electrically insulating housing between a first position in which the voltage surge protection device is non-activated, and a second position in which the voltage surge protection device is activated, wherein the first part and the second part are electrically connected by the movable electrical contact when in its the second position.

6. The voltage surge protection device as claimed in claim 2, comprising a movable electrically insulating ring arranged between the expandable member and the electrical contact, and wherein the expandable member is arranged to act on the movable electrical contact via the movable electrically insulating ring.

7. The voltage surge protection device as claimed in claim 2, wherein the movable electrical contact is arranged in a bore through an electrically insulation housing enclosing the varistor at least partly in a lengthwise direction, one end of the movable electrical contact being in contact with the expandable member arranged as a shell around the varistor material and partly in the bore, the movable electrical contact being arranged to move in a radial direction.

8. The voltage surge protection device as claimed in claim 1, wherein the movable electrical contact comprises a movable helical spring or a movable metal ring.

9. The voltage surge protection device as claimed in claim 8, wherein the varistor comprises an electrically insulating housing enclosing the varistor at least partly in a lengthwise direction of the voltage surge protection device, and wherein the movable electrical contact is arranged to be movable along the electrically insulating housing between a first position in which the voltage surge protection device is non-activated, and a second position in which the voltage surge protection device is activated, wherein the first part and the second part are electrically connected by the movable electrical contact when in its the second position.

10. The voltage surge protection device as claimed in claim 8, comprising a movable electrically insulating ring arranged between the expandable member and the electrical contact, and wherein the expandable member is arranged to act on the movable electrical contact via the movable electrically insulating ring.

11. The voltage surge protection device as claimed in claim 1, wherein the varistor comprises an electrically insulating housing enclosing the varistor at least partly in a lengthwise direction of the voltage surge protection device, and wherein the movable electrical contact is arranged to be movable along the electrically insulating housing between a first position in which the voltage surge protection device is non-activated, and a second position in which the voltage surge protection device is activated, wherein the first part and the second part are electrically connected by the movable electrical contact when in its the second position.

12. The voltage surge protection device as claimed in claim 11, comprising a movable electrically insulating ring arranged between the expandable member and the electrical contact, and wherein the expandable member is arranged to act on the movable electrical contact via the movable electrically insulating ring.

13. The voltage surge protection device as claimed in claim 11, wherein the movable electrical contact is arranged between the expandable member and an electrically insulating ring, and wherein the movable electrical contact contacts a helical spring when in the second position, the helical spring being arranged on the second part.

14. The voltage surge protection device as claimed in claim 1, comprising a movable electrically insulating ring arranged between the expandable member and the electrical contact, and wherein the expandable member is arranged to act on the movable electrical contact via the movable electrically insulating ring.

15. The voltage surge protection device as claimed in claim 14, wherein the movable electrically insulating ring is arranged to be movable along an electrically insulating housing enclosing the varistor at least partly in a lengthwise direction of the voltage surge protection device.

16. The voltage surge protection device as claimed in claim 1, wherein the movable electrical contact is arranged in a bore through an electrically insulation housing enclosing the varistor at least partly in a lengthwise direction, one end of the movable electrical contact being in contact with the expandable member arranged as a shell around the varistor material and partly in the bore, the movable electrical contact being arranged to move in a radial direction.

17. The voltage surge protection device as claimed in claim 1, wherein the expandable member comprises a material expandable when subjected to temperature rises and/or pressure.

18. The voltage surge protection device as claimed in claim 1, wherein the expandable member comprises silicone gel, silicone paste or silicone grease.

19. A circuit breaker comprising one or more semiconductor unit(s) connected in series, wherein a voltage surge protection device as claimed in claim 1 is connected in parallel to each such semiconductor unit(s).

20. A circuit breaker comprising two or more semiconductor units, wherein the semiconductor units are connected anti-serially pairwise, and wherein a voltage surge protection device as claimed in claim 1 is connected in parallel to each such pair of semiconductor units.

* * * * *